United States Patent
Maye et al.

(10) Patent No.: US 6,198,004 B1
(45) Date of Patent: Mar. 6, 2001

(54) PROCESS FOR HYDROGENATION OF ISOALPHA ACIDS

(75) Inventors: John Paul Maye, Great Falls, VA (US); Jianping Xu, Gaithersburg, MD (US); George Gauthier, Groton, CT (US); Scott W. Weis, Milwaukee, WI (US)

(73) Assignee: Haas Hop Products, Inc., Washington, DC (US)

( * ) Notice: Subject to any disclaimer, the term of this patent is extended or adjusted under 35 U.S.C. 154(b) by 0 days.

(21) Appl. No.: 09/329,299

(22) Filed: Jun. 10, 1999

(51) Int. Cl.$^7$ .............................. C07C 45/67; C12C 3/00
(52) U.S. Cl. .................... 568/341; 568/366; 568/377; 568/379; 426/600
(58) Field of Search ..................... 568/347, 350, 568/366, 341, 377, 379; 426/600, 422

(56) References Cited

U.S. PATENT DOCUMENTS

| | | | |
|---|---|---|---|
| 3,044,879 | 7/1962 | Koch et al. | 99/50.5 |
| 3,079,262 | 2/1963 | Hougen et al. | 99/50.5 |
| 4,002,683 | 1/1977 | Todd, Jr. | 260/586 |
| 4,154,865 | 5/1979 | Grant | 426/600 |
| 4,247,483 | 1/1981 | Baker et al. | 568/341 |
| 4,297,509 | 10/1981 | Chiasson | 562/456 |
| 4,590,296 | 5/1986 | Cowles et al. | 568/366 |
| 4,644,084 | 2/1987 | Cowles et al. | 568/341 |
| 4,767,640 | 8/1988 | Goldstein et al. | 426/600 |
| 4,778,691 | 10/1988 | Todd, Jr. et al. | 426/600 |
| 4,918,240 | 4/1990 | Todd, Jr. et al. | 568/366 |
| 4,929,773 | 5/1990 | Ryan | 568/814 |
| 5,013,571 | 5/1991 | Hay | 426/600 |
| 5,166,449 | 11/1992 | Todd, Jr. et al. | 568/377 |
| 5,200,227 | 4/1993 | Guzinski | 426/600 |
| 5,296,637 | 3/1994 | Stegink et al. | 568/341 |
| 5,370,897 | 12/1994 | Smith et al. | 426/600 |
| 5,523,489 | 6/1996 | Ting et al. | 568/347 |
| 5,600,012 | 2/1997 | Poyner et al. | 568/347 |
| 5,767,319 | 6/1998 | Ting et al. | 568/347 |
| 5,874,633 | 2/1999 | Ting et al. | 568/347 |
| 5,917,093 | 6/1999 | Ting et al. | 568/366 |

FOREIGN PATENT DOCUMENTS

| | | |
|---|---|---|
| 1145240 | 3/1960 | (GB) . |
| 98/18900 | 5/1998 | (WO) . |

OTHER PUBLICATIONS

Brown, P.M., Howard, G.A. and Tatchell, A.R., "Chemistry of Hop Constituents, Part XIII. The Hydrogenation of iso–Humulone," *J. Chem. Soc.*, 545–551 (1959).
W. J. G. Donnelly and P.V.R. Shannon, "cis—and trans–Tetrahydroisohumulones," *Journal of The Chemical Society*, 1970, pp. 524–530.
Dekeukeleire et al. "The Structure of the Absolute Configuration of (–) Humulone," Tetrahedron, 26:385–393 (1970).
Veryele, M. "The Chemistry of Hops," Brewring Schience vol. 1, Chapter 4, pp. 279–323 (1979).
Dekeukeleire et al. "Regiospecific Singlet Oxygen Oxidation of (–) R–Tetrahydrohumulone and Hexahydrocolupulone," Bull. Soc. Chem. Belg. 85, No. 5: 293–304 (1976).
Byrne et al. "Reduction Products from cis–and trans–s–Isocohumulone," J. Chem. Soc. pp. 2810–2813 (1971).
Carson, J.F. "The Alkaline Isomerization of Humulone," Isohop Hydrogenation in Exptl., 74:4615–4620 (1952).
Verzele et al. "Sur La Transformation De L'Humulone," Cong. Internat. Indust. Ferm., pp. 297–301 (1947).
Hay, Bruce A. And Homiski, John W. "Efficient One–Step Preparation of the Beer Additive Tetrahydroiso α–Acids," Journal of Agricultural and Food Chemistry, No. 496, pp. 3–5 (1991).

*Primary Examiner*—Sreeni Padmanabhan
(74) *Attorney, Agent, or Firm*—Morgan, Lewis & Bockius LLP

(57) ABSTRACT

The invention relates to a process for converting alpha acid and isoalpha acids to tetrahydroisoalpha acid. The process comprises isomerizing an alpha acid to produce isoalpha acid and hydrogenating the isoalpha acid in the presence of a noble metal catalyst wherein, the noble metal catalyst is added incrementally or continuously throughout the hydrogenation step. The invention also relates to tetrahydroisoalpha acids made by the above process.

28 Claims, No Drawings

PROCESS FOR HYDROGENATION OF ISOALPHA ACIDS

FIELD OF THE INVENTION

The invention relates to an improved process for converting alpha acids and isoalpha acids into tetrahydroisoalpha acid for use as hop flavors. According to the process, tetrahydroisoalpha acids are produced in high yield and high purity from alpha acid and isoalpha acid solutions containing low to very high levels of sulfur without any pretreatment.

BACKGROUND OF THE INVENTION

Hops have been used for centuries for the purpose of contributing a clean bitter taste to beer. Analysis of hop constituents has demonstrated that the most important bittering compounds derived naturally from hops are a group of analogous compounds generally known as alpha acids (humulones).

In a conventional brewing process, hop cones are boiled with sweet wort in a copper kettle for about one to two hours, and then the resulting wort mixture is filtered and allowed to cool. Isoalpha acids are produced by isomerization of alpha acids during boiling of the wort. The isomerization yield in the boiling process, however, is low. Such low yields have led to the development of commercial processes which extract the active compounds, such as, alpha acids and beta acids, from hops and convert them to the desired hop flavors, e.g., isoalpha acids, rhoisoalpha acids, tetrahydroisoalpha acids and hexahydroisoalpha acids, at relatively high yields. The commercially produced hop product may then be added post-fermentation to maximize utilization and provide consistent hop flavor.

It is well known in the brewing industry that isoalpha acids are susceptible to degradation upon exposure to light. This degradation in beer produces a highly undesirable skunk-like odor.

It is also well known in the art that hydrogenating the isoalpha acids (or the precursor alpha or beta acids) will increase the light stability of the beer. This hydrogenation requires a catalyst, such as palladium on carbon (Pd/C).

The hydrogenation of normal homolog isoalpha acids with platinum oxide is described by P. M. Brown, G. A. Howard and A. B. Tatchell, J. Chem. Soc. 545 (1959). However, the process results in low yields of tetrahydroisoalpha acid. E. Byrne and S. J. Shaw, J. Chem. Soc. (C), 2810 (1971) describes the reduction of tetrahydroisoalpha acid to deoxygenated products by hydrogenation with palladium on carbon in methanol at a pH of about 3. A process for isomerizing and hydrogenating alpha acids to produce tetrahydroisoalpha acid (THIAA) or hexahydroisoalpha acid (HHIAA) is described in U.S. Pat. No. 5,013,571, the disclosure of which is herein incorporated by reference. Further, U.S. Pat. No. 5,600,012 describes a single step process for making pure tetrahydroisoalpha acids from pure iso-alpha acids by a controlled hydrogenation process.

When alpha, beta, or isoalpha acids are hydrogenated, compounds which are referred to as "catalyst poisons," and which are associated with the hop extract, foul the catalyst. Such fouling of the catalyst causes the hydrogenation of the alpha, beta, or isoalpha acids to proceed slower than normal and eventually cease before all of the alpha, beta, or isoalpha acids are hydrogenated. In some instances, the catalyst becomes so quickly fouled that it must be replaced during the middle of the hydrogenation process in order for the hydrogenation to proceed to completion. Simple replacement or changeout of the catalyst is an unsuitable solution to the poisoning problem for at least two reasons. First, the substitution of a new catalyst midway through the hydrogenation process can promote the formation of overreacted products. Second, the catalyst is quite expensive, and frequent replacement of the catalyst greatly adds to the cost of production. Accordingly, there remains a need for a process for producing tetrahydroisoalpha acids hop flavors from alpha acids that is simple, inexpensive, and high yielding.

SUMMARY OF THE INVENTION

It has been discovered that when a noble metal catalyst is added incrementally or continuously during the hydrogenation step, alpha acids and isoalpha acids can be converted to tetrahydroisoalpha acids at lower pressures, lower temperatures, and shorter reaction times than previously known. It has also been discovered that the incremental or continuous addition of noble metal catalyst allows for the conversion of alpha acid containing high levels of sulfur in exceptional yield.

Accordingly, the invention relates to a process for converting alpha acid and isoalpha acids to tetrahydroisoalpha acid. The process comprises isomerizing alpha acid to isoalpha acid and hydrogenating the isoalpha acid in the presence of a noble metal catalyst wherein, the noble metal catalyst is added incrementally or continuously throughout the hydrogenation step.

In another embodiment of the invention, the tetrahydroisoalpha acid may be further reduced to produce hexahydroisoalpha acid.

Additional objects and advantages of the invention are discussed in the detailed description which follows, and will be obvious from that description, or may be learned by practice of the invention. It is to be understood that both this summary and the following detailed description are exemplary and explanatory only and are not intended to restrict the invention.

DETAILED DESCRIPTION OF THE INVENTION

The invention relates to a process for converting alpha acids and isoalpha acids to tetrahydroisoalpha acid. In the process, alpha acid is isomerized to isoalpha acid. The isoalpha acid is then hydrogenated in the presence of a noble metal catalyst to form tetrahydroisoalpha acid (THIAA). The noble metal catalyst is added incrementally or continuously throughout the hydrogenation step. The process of the invention may be demonstrated by the following reaction scheme:

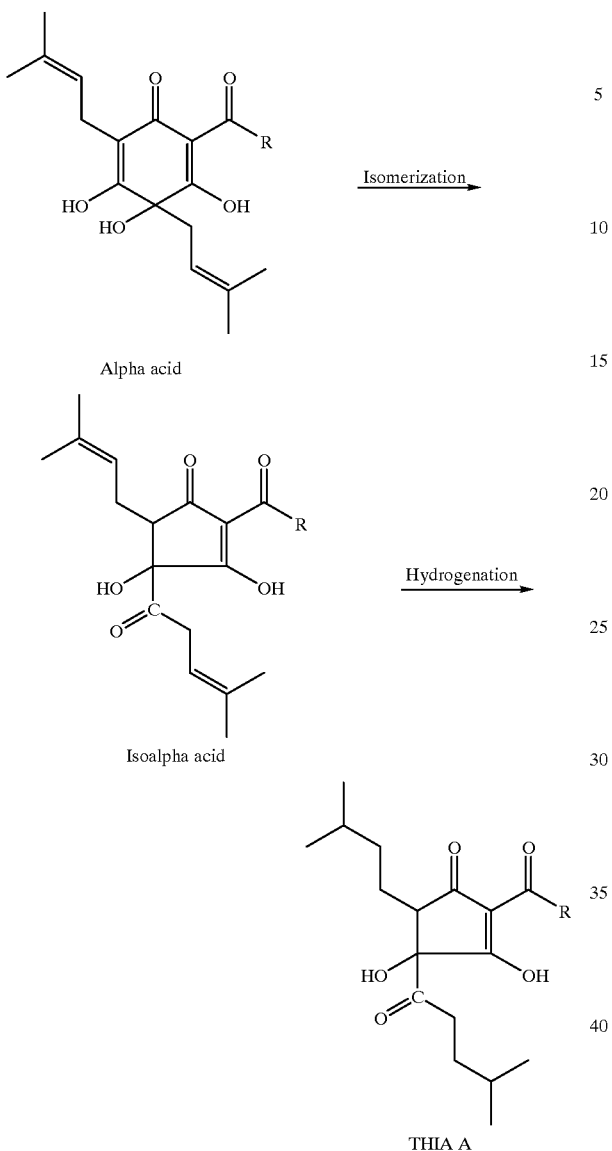

wherein R is a lower alkyl, preferably, a $C_1$–$C_6$ alkyl, more preferably isopropyl, isobutyl and sec-butyl.

Accordingly, the invention relates to a process of converting isoalpha acid to tetrahydroisoalpha acid comprising the step of hydrogenating the isoalpha acid in the presence of a noble metal catalyst, wherein the noble metal catalyst is added continuously or incrementally throughout hydrogenation.

The Isomerization Step

According to the process of the invention, alpha acid is isomerized to isoalpha acids. As discussed above, alpha acids are derived from hops where they exist as different homologs. Typically, the primary homologs are the isopropyl, isobutyl and sec-butyl homologs. The alpha acids can be isolated from hops by a process in which the organic components of the crushed hop cones are extracted by liquid $CO_2$ as taught, for example, by U.S. Pat. Nos. 5,523,489 and 4,590,296, the disclosures of which are herein incorporated by reference. The alpha acids are then separated from the hop extract using an aqueous extraction at a pH of about 8 to about 8.3. The process of the invention is applicable to alpha acids having the formula:

wherein R is a lower alkyl, preferably a $C_1$–$C_6$ alkyl, more preferably isopropyl, isobutyl and sec-butyl. The process according to the invention can be used to convert alpha acids having a high sulfur content, i.e., ranging from about 400 to about 650 ppm.

The isomerization step of the process of the invention comprises the step of boiling a protic solvent solution containing from about 10% to about 40% by weight alpha acid at a temperature ranging from about 90° C. to about 105° C. for about 2.0 to about 4 hours. Any protic solvent system that results in the desired end product may be used. Exemplary protic solvent systems include, but are not limited to, water, alcohol, such as $C_1$–$C_3$ alcohols, including isopropanol, ethanol, and methanol and mixtures thereof. Preferably, the solvent system is reaction inert. The expression "reaction inert solvent" as used in the context of the invention refers to a solvent which does not interact with starting material, reagents, intermediates or desired product in a manner which adversely affects the yield of the desired product. In addition, nonprotic solvents can be used in combination with protic solvent. These include chlorinated solvents such as methylene chloride, dichloroethylene, or trichloroethylene and hydrocarbon solvents such as hexane. Preferably, the alpha acid protic solvent solution is an aqueous solution containing from about 10% to about 15% by weight of alpha acid.

The pH of the alpha acid solution during the isomerization step should be such that the isomerization step favors isoalpha acid. Preferably, the pH is such that the alpha acid is soluble in the solvent system described above. It is especially preferred that the pH range from about 5 to about 12, as below about pH 5 the isomerization is not efficient, while above about pH 12 side chain cleavage can occur. Preferably the pH ranges from about 8 to about 12, more preferably from about 9 to about 11.

Depending on the form of the alpha acid (oil, salt, etc.), the pH may require adjustment. This is accomplished by conventional methods, such as addition of a suitable base, including an alkali metal hydroxide, preferably sodium or potassium hydroxide. A buffering agent may be advantageously utilized in quantities sufficient to aid in maintaining the desired pH. Typically, a buffering agent such as potassium or sodium carbonate may be utilized.

In addition, it is preferred that an isomerization catalyst, such as, an alkaline earth metal salt or oxide is added to facilitate the isomerization. Preferred alkaline earth metal salts include, but are not limited to, magnesium chloride, calcium chloride, and magnesium sulfate. Magnesium sulfate is particularly preferred. Preferred alkaline earth metal oxides include magnesium oxide. The alkaline earth metal salt or oxide isomerization catalyst is present in an amount effective to achieve the desired isomerization. Preferably, the amount of alkaline earth metal salt or oxide isomerization catalyst ranges from about 5% to about 10% relative to alpha acids. It is particularly preferred to incorporate the isomerization catalyst into the reaction mixture at a temperature of about 60° C. for about 30 minutes to about 1 hour prior to the boiling step.

Completion of the isomerization step is monitored by conventional HPLC and UV techniques known in the art. The conversion of alpha acids to isoalpha acids is complete when the concentration of the alpha acids as measured by HPLC divided by the concentration of the isoalpha acids (IAA) or reaction mixture as measured by UV is less than 0.04. For example, if the alpha acid concentration measures 0.5% alpha acids by HPLC and the IAA concentration measures 13% by UV then the reaction is complete as 0.5 divided by 13 is 0.038.

After isomerization, the reaction mixture is acidified to a pH of less than or equal to 1.0 with sulfuric acid. The reaction mixture is stirred for about one hour and then allowed to separate into two layers. The top product layer is then isolated which may be water washed, for example, with 1 to 2 parts deionized water, with agitation for about 1 to about 2 hours and then formulated or into a 15% to 30% by weight solution. The solution is then pH adjusted to about 6.5 to about 11, preferably from about 8.5 to about 9.5 by adding a suitable base, such as an alkali metal, e.g., potassium or sodium, hydroxide and then hydrogenated as described below.

The Hydrogenation Step

During the hydrogenation step, isoalpha acid is hydrogenated or reduced to tetrahvdroisoalpha acid (THIAA) of the following formula:

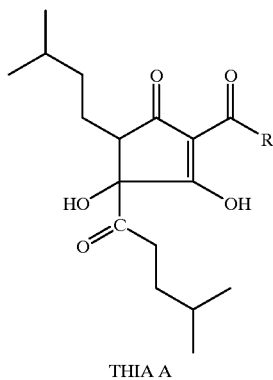

THIA A wherein R is as defined above.

As the THIAA is produced from the above described alpha acid (which when extracted from hops exist as homologs and isomers), the THIAA produced by the processes of the invention generally exists as the corresponding homologs and isomers of the above described alpha acids.

The hydrogenation step of the invention is conducted in the presence of a noble metal catalyst. According to the invention, the noble metal catalyst is added incrementally or continuously throughout the hydrogenation step. The incremental or continuous addition of catalyst decreases the amount of catalyst needed and shortens reaction time.

The hydrogenation step may be conducted in any conventional hydrogenator known in the art. Any source of hydrogen gas may be used in the hydrogenation step. The reactions may be performed under a mixture of hydrogen with a safe and reaction inert gas such as nitrogen. The hydrogenation step may also employ a polar solvent including, but not limited to, water and ethanol.

A noble metal hydrogenation catalyst, such as, platinum, palladium, iridium, rhenium, mercury, ruthenium and osmium is employed in the hydrogenation step which increases the speed of the reaction. It is especially preferred that palladium is utilized as it has been found to provide high yields, good purity, and short reaction times.

The catalyst employed in the hydrogenation step is preferably disposed on a finely divided support material. Preferred support materials include, but are not limited to, finely divided carbon, barium carbonate, barium sulfate, calcium carbonate, and alumina. Suitable carbon supported palladium catalysts are well known in the art.

The preferred amount of catalyst ranges from about 5% to about 15% by weight based on the isoalpha acid is added over a time period ranging from about 1 to about 10 hours. An addition rate of about 1 to about 10% catalyst by weight, based on the isoalpha acid, per hour to three hours is preferred. More preferably, the noble metal catalyst is added at from about 2% to about 2.5% by weight, based on the isoalpha acid, about every 2 to about 2.5 hours. Generally, for every 100 ml of a 10 wt. % aqueous solution of isoalpha acid about 10.5 g of catalyst in employed. The reaction should be complete within 1–2 hours after the last catalyst addition. Preferably, the reaction should be complete within 3 to 10 hours, more preferably within 6 to 8 hours of total reaction time with all of the catalyst being added within about 3 to about 6 hours, preferably within about 4 to about 5 hours.

Alternatively, the catalyst may be added "continuously", i.e., slowly injected into the hydrogenator using a high pressure pump. Accordingly, in another embodiment the invention relates to a process of converting alpha acid to THIAA comprising isomerizing an alpha acid to produce isoalpha acid and hydrogenating the isoalpha acid in the presence of a noble metal catalyst which is continuously added using a high pressure pump over a period of not less than 30 minutes throughout the hydrogenation step. Preferably, for continuous addition of the catalyst, the catalyst is added at an addition rate of 2% catalyst (dry) by weight of the isoalpha acid per hour for a period ranging from about 4 to about 6 hours.

Generally, the reaction time varies with the pressure, temperature, reactant concentration, catalyst amount, etc. However, for typical conditions of 50 psig, 70° C., 20% by weight isoalpha acids, 10% by weight catalyst, and reaction times of about 6 hours to about 8 hours are normal. In cases where the sulfur level is very high, i.e., greater than 550 ppm in the starting hop extract, hydrogenation may not go to completion and an additional 1–2% catalyst may be required to drive the reaction to completion.

The hydrogenation step of the process of the invention may be performed at a pressure ranging from about 20 to about 2000 psi $H_2$. Preferably, the reaction is performed at a pressure of about 50 to about 150 psig, more preferably, from about 40 psig to about 60 psig because of typical equipment constraints. The temperature generally ranges from about 50° C. to about 110° C. because below about 50° C. the activation energy is too high and above about 200° C. the reactants and products may degrade.

The hydrogenation step is preferably conducted at a pH ranging from about 5 to about 12, as at a pH of below about 5, hop oil precipitation and hydrolysis leading to humulohydroquinone can occur and at a pH of above about 12, side chain cleavage may occur. More preferably, the pH ranges from about 6.5 to about 10.5.

Typically, the hydrogenation step is run in the solvent system described above. The reaction is performed at about 10% to about 40% concentration of isoalpha acids to facilitate productivity and dissolution. Preferably, the reaction is run at about 20% to about 30% isoalpha acid concentration.

Like the isomerization step, hydrogenation completion is measured by HPLC chromatography. When converting IAA into THIAA, the dihydro IAA peaks should be less than 4% by HPLC area. As long as the dihydro IAA peaks are less than 4% overall, there should be no IAA left in the reaction mixture and the reaction is complete. Generally, the overall peak area of THIAA should be greater than 90%.

The resulting THIAA may be acidified and water-washed as described for example in U.S. Pat. No. 5,013,571, the disclosure of which is herein incorporated by reference. A typical acidifying and water-washing step comprises acidifying the resulting THIAA to a pH of below about 2 with an acid, such as sulfuric acid. The oil layer is then separated and washed with 1 to 2 parts deionized water and then shaken for about 1 to about 2 hours.

The invention also relates to a process for the substantially simultaneous isomerization and hydrogenation of alpha acids to THIAA. Such a process is described in U.S. Pat. No. 5,013,571, the disclosure of which is herein incorporated by reference. By "substantially simultaneous" is meant that the isomerization and hydrogenation occur in the same reaction medium. However, it is believed that isomerization precedes hydrogenation within the reaction medium. The conditions described above for the two step isomerization and hydrogenation process including the incremental and continuous catalyst addition, are also used for the simultaneous isomerization and reduction.

The Reduction Step

In another embodiment of the invention, the THIAA is further reduced to produce hexahydroisoalpha acid (HHIAA) by the following reaction scheme:

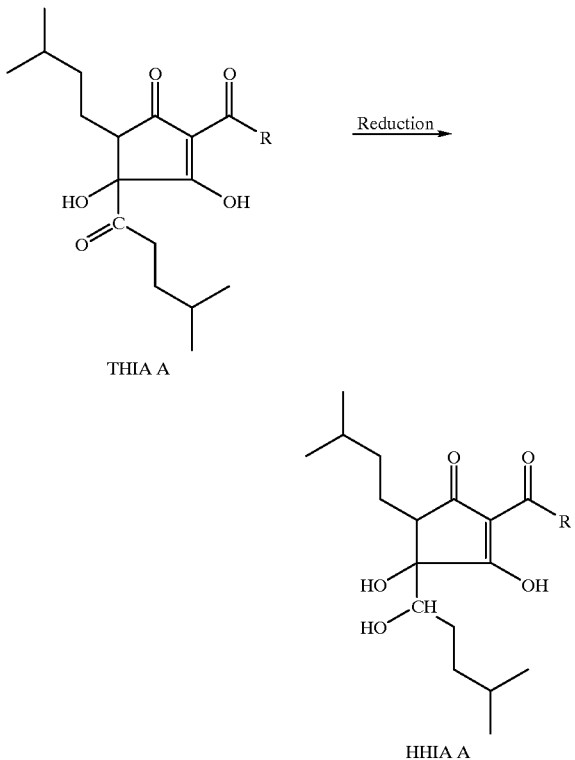

When HHIAA is the desired product, the reduction step employs a reducing agent of the alkali metal borohydride type such as sodium borohydride and potassium borohydride because of their reactivity and specificity. Sodium borohydride is particularly preferred because of its commercial availability as an aqueous solution stabilized with sodium hydroxide. The reducing agent is used in an amount effective to achieve the desired product. Preferably, from about two to about six hydride equivalents of a reducing agent such as sodium borohydride are used. A hydride equivalent is defined as the number of hydrogen atoms available for substrate reduction, for example, sodium borohydride has four hydride equivalents.

The process of the invention provides high yields (e.g., 90% and above) of THIAA depending on a variety of factors including temperature, time, catalyst loading, etc. This invention makes a significant contribution to the field of beer making food additives by providing effective, efficient methods of producing THIAA and HHIAA. The THIAA and/or HHIAA produced by this invention is of high purity. The high yielding reaction sequence results in fewer by-products resulting in a material that is of high purity and well suited for use in a food product such as beer.

EXAMPLES

The practice of the invention is disclosed in the following examples, which should not be construed to limit the invention in any way.

Example 1

In this example alpha acids from both low and high sulfur hop extracts were converted into high purity THIAA.

Isomerization:

In each reaction about 15% alpha acid solution was pH adjusted to a range of from about 9.0 to about 9.5 at 20° C., the solution was then heated to 60° C. and the pH rechecked to insure a pH range of from about 8.5 to about 9.0. Then 10 mol% of $MgSO_4$ was added to the reaction mixture as a 50% solution in water. The $MgSO_4$ reaction mixture was allowed to stir for one hour at 60° C. then the mixture was brought to a boil (100–105° C.). While boiling, the volatiles (hop oils) were removed via steam distillation. Within 3 to 4 hours the reaction was complete. The reaction mixture was quickly acidified with 50% or greater $H_2SO_4$ to a pH of 1.0, or less while cooling the reaction mixture to 55–65° C. and stirred for one hour. Agitation ceased, separate layers formed and the top "product" layer was isolated. The "product" layer was washed with de-ionized water then formulated to a 15% solution with a pH of 9.0 prior to hydrogenation. The isoalpha acid (LIA) made from this process showed purities in the 85–95% range with a recovery yield of better than 90%.

Hydrogenation:

A 15% IAA solution, at a pH of 9.0 was mixed with 1% KBB activated carbon at 60° C. for 30 to 60 minutes and then 2.5% of 5% Pd/C (dry) catalyst was added to the reaction mixtures and pressurized to 120–150 psi with $H_2$ at 500 RPM and at 60° C. for the times and conditions indicated in Table 1, and monitored by HPLC. The area of the tetrahydroisoalpha acid chromatographic peaks as a percentage of total peak area was used to measure reaction completion.

The catalyst for each reaction was added as follows:

Reaction 1A:

2.5% catalyst was added at hours 0, 1.5, 3, and 5 totaling 10%, by weight of isoalpha acid, of catalyst.

Reaction 1B:

2.5% catalyst added at hours 0, 1.5, 3, and 5.5, totaling 10%, by weight isoalpha acid, of catalyst.

Reaction 1C:

All of the catalyst, i.e., 10% by weight isoalpha acid, was added in one addition.

Reaction 1D:

Due to the high sulfur content of the hop extract, i.e, 562 ppm, an additional 2.5% catalyst was need to drive the Reaction 1D to completion. Thus, this reaction required a total of 12% catalyst, by weight of the isoalpha acid. 2.5% catalyst was added at hours 0, 1.5, 3, 5, and 7.5.

TABLE 1

| Reaction No. | 1A | 1B | 1C | 1D |
|---|---|---|---|---|
| Rxn pH | 10 | 9 | 9 | 9 |
| ppm sulfur | 382 | 438 | 438 | 562 |
| total % catalyst added | 4 additions @ 2.5% | 4 additions @ 2.5% | 1 addition @10.0% | 5 additions @2.5% |
| Time for completion (hours) | 6.0 | 7.75 | 12.0 | 9.0 |
| % Purity of THIAA | 83 | 84.4 | 75.9 | 81.0 |
| % Yield of THIAA | 96.3 | 99.9 | 91.9 | 96.9 |

The benefits of incremental addition of catalyst may be seen from the data tabulated in Table 1. In Reaction 1C 10% catalyst was added all at once and, this reaction took 12 hours to complete. In contrast, where the catalyst was added incrementally, i.e., 2.5% every 1.5 to 2 hours, the reaction was complete within 6 to 8 hours. Even in the case of high sulfur hop extracts, where the sulfur content was measured at 562 ppm sulphur, i.e., 1D, although an additional 2.5% catalyst was needed to drive the reaction to completion, the reaction was complete in 9 hours, a significant advantage over the 12 hours reaction time of the one time addition of catalyst.

Example 2

This example demonstrates the isomerization and hydrogenation of low purity, high sulfur alpha acid hop extract to THIAA.

Isomerization:

901 grams of a solution of 13.7% by weight as measured by UV spectroscopy alpha acid, (measuring by HPLC as 13.6% alpha acid, 1.1% isoalpha acid, 0.4% beta acid and 4.2% humulinic acid) having 492 ppm sulfur was pH adjusted to 9.0 at 20° C. with a 50/50 w/w $K_2CO_3$ solution. The reaction mixture was heated to 60° C. and 8.7 grams of $MgSO_4$ was added to the reaction mixture. The mixture was then heated to a boil (100–105° C.). After 3 hours and 15 minutes the reaction was measured complete by HPLC. The reaction mixture was then acidified with 80.1 grams of 50% v/v $H_2SO_4$ to a pH of 0.9 while cooling the reaction mixture to 55–65° C. The acid quench was stirred for one hour, agitation was stopped, and the upper oily product layer was allowed to separate from the lower acidic water layer over one hour. The product layer was isolated (166.3 grams) and water washed with roughly two parts de-ionized water (350 ml) at 55–65° C. for one hour. After performing the de-ionized water wash agitation was stopped and the product layer settled to the bottom. The bottom oil layer (160.1 grams) was isolated and formulated with 282.5 grams de-ionized water and 53.5 grams of 45% w/v KOH to a pH of 9.1. The yield was 487.6 grams of a 30.1% by weight solution (as measured by UV spectroscopy) of isoalpha acid. The recovered yield was measured as 86% and the purity was measured at 82.6% by HPLC. The lower than expected purity and yield was due to the very large amount of humulinic acid in the starting, alpha acid solution.

Hydrogenation:

181 grams of the above 30.1% isoalpha acid solution, was pH adjusted to 8.5 by adding 4 drops of 30% v/v $H_2SO_4$. 2.25 grams of 50% wet 5% Pd/C (2.06% catalyst as measured by UV spectroscopy) mixed with 30 ml of de-ionized water was added to the IAA solution which was charged to the hydrogenator, heated to 70° C., stirred at 500 rpm and pressured to 150 psi with hydrogen. After reacting for 1.5 hours another 2.25 grams of catalyst in 30 ml of de-ionized water was added, again maintaining a temperature of 70° C. and a pressure range of 120–150 psi $H_2$. After another 1.5 hours of reacting a third aliquot of catalyst was added, 2.25 grams mixed with 30 ml of de-ionized water. After 2 hours, 1.11 grams (1% as measured by UV spectroscopy) of catalyst mixed with 15 ml of de-ionized water was added and the mixture was allowed to react for 1 hour. Finally, another 1.11 grams of catalyst mixed with 15 ml of de-ionized water was added to the reaction mixture and stirred for 1 more hour. After 7 hours the reaction was complete.

In total 8.7% catalyst was added to convert this high (493 ppm) sulfur hop extract into THIAA. When the reaction was measured complete by HPLC, the mixture was discharged from the hydrogenator and 255 grams collected. This mixture was immediately filtered hot. The hydrogenator was then flushed with 120 ml of de-ionized water at pH of 11.0 and 70° C. The 120 ml of de-ionized water was filtered warm and combined with the original 225 grams collected from the reactor. A total of 375 ml of THIAA was collected which measured 12.2% by weight as measured by UV spectroscopy and 12.2% by weight and 9.47% as measured by HPLC. The yield of this reaction step was measured as 95%. The purity was measured as 77.6%.

This example demonstrates that THIAA in high yield can be obtained from alpha acid solutions containing very high levels of sulfur without requiring the use of Raney Nickel as a pretreatment.

Example 3

In this example, the hydrogenation of an isoalpha acid solution at 120–150 psi, Reaction No. 3A, was compared to hydrogenation of an isoalpha acid solution at 50 psi, Reaction No. 3B.

Isomerization:

An aqueous alkaline solution of alpha acids (15% by weight as measured by UV) was made from a hop extract measuring 438 ppm sulfur. This alpha acid solution was pH adjusted to 9.25 with 50% $K_2CO_3$ at 20° C., heated to 60° C. and treated with 10 mol % $MgSO_4(7H_2O)$. The mixture was stirred for one hour then brought to a boil 100–105° C. allowing the hop oils to be removed via a Dean Stark trap. After 3 hours the reaction mixture was quenched with 50% $H_2SO_4$ to a pH of 1 or less while cooling the mixture to 55–60° C. The product layer was isolated and formulated to a 30.8% by weight solution (as measured by UV spectroscopy) and 26.2% by weight (as measured by HPLC) using de-ionized water and 45% w/v KOH to a pH of 9.0. As measured by UV and HPLC spectroscopy the yield of IAA was 95% and the purity measured 85%.

Hydrogenation:

For each reaction 187 grams of the above 30.8% isoalpha acid solution as measured by UV spectroscopy, was pH adjusted to 8.4 with 4 drops of 50% $H_2O_4$, charged into the hydrogenator and heated to 70° C. Then 2.5 grams of 50% wet 5% Pd/C catalyst was mixed with 30 ml of de-ionized water and charged to the hydrogenator (2.5% catalyst as measured by HPLC). The reactor was pressurized to 50 psi for Reaction No. 3A and 150 psi for Reaction No. 3B, with $H_2$ and stirred at 500 RPM. For each reaction after reacting for 1.5 hours a second aliquot of 2.5% catalyst was added, again maintaining a temperature of 70° C. and for, Reaction 3A, a pressure of 120–150 psi and, for Reaction 3B, a pressure of 50. After an additional 3 hours of reacting a third aliquot of 2.5% catalyst was added under the same conditions. After an additional 5 hours a fourth aliquot of catalyst was added, 1% by weight for Reaction No. 3A and 2.5% by weight for Reaction No. 3B. After stirring for an additional two hours the reaction mixtures were checked by HPLC and the reaction was almost complete. A final aliquot of 1% catalyst was added to each reaction to drive the reaction to completion. The reactions were allowed to continue for an additional two hours. The results of the reactions are set forth in Table 2.

TABLE 2

| Reaction No. | 3A | 3B |
|---|---|---|
| $H_2$ pressure (psi) | 120–150 | 50 |
| Rxn temp. ° C. | 70 | 70 |
| % Purity THIAA | 80.6 | 83.5 |
| % Yield THIAA | 98.8 | 97.0 |
| total % catalyst added | 3 additions @ 2.5% + 2 additions @ 1% | 4 additions @ 2.5% + 1 addition @ 1% |
| time to complete (h) | 6.5 | 9.0 |

There appeared to be no appreciable difference in running the reaction at 50 psi vs. 150 psi. Reaction 3B was essentially complete in 6.5 hours with 10% catalyst added. The HPLC analysis of the two reactions before the fourth and fifth catalyst additions are set forth in Table 3 below.

TABLE 3

| Reaction No./ Hour/ total catalyst added | area % isoalpha acid | area % dihydroisoalpha acid | area % THIAA |
|---|---|---|---|
| 3A/6.5/9.5% | 1.04 | 7.73 | 87.86 |
| 3B/7/10% | 0.70 | 6.25 | 88.18 |

As seen from Table 3, the results of the two reactions are nearly identical after 6.5/7 hours. Accordingly, it appears that the addition of 1% more catalyst to Reaction 3B was not necessary. This Example demonstrates that when hydrogenation is conducted at a pressure as low as 50 psi the reaction requires relatively no additional catalyst or time when compared to a similar process performed at 150 psi.

Example 4

In this example, the results of Pd/C catalyst added ten times vs. four times vs. one time to a reaction mixture containing isoalpha acids hydrogenated at 50–150 psi to 70° C. were compared. A 30% isoalpha acid solution having a sulfur content of 382 ppm and a pH of 8.5, was heated to 70° C. and treated with 5% Pd/C catalyst one time vs. four times vs. 10 times, maintaining a pressure of 50 or 150 psi. For reaction 4B the catalyst was added every 2 hours and for reaction 4C the catalyst was added every ½ hour. The results are set forth below in Table 4.

TABLE 4

| Reaction No. | 4A | 4B | 4C |
|---|---|---|---|
| $H_2$ Pressure psi | 120–150 | 50 | 50 |
| Rxn Temp. ° C. | 70 | 70 | 70 |
| Catalyst Addition | 1 addition @ 10% | 4 additions @ 2.5% | 9 additions @ 1% + 1 addition @ 0.25% |
| Total reaction time (hr)/total catalyst added (% wt.) | 12/10% | 8/10% | 6.5/9.25% |
| % yield THIAA | 88.7 | 90.2 | 90.6 |

Example 5

In this example, THIAA was successfully produced on a commercial scale, via low pressure hydrogenation. Two large batches about 300 gallons of about 15 wt. % aqueous solution of isoalpha acids were first made from high sulfur (~500 ppm) hop extract. Both of these batches were then subdivided into six smaller batches and hydrogenated. In all, twelve hydrogenations were performed at 50 psi and at 65–85° C. over 5 to 8.5 hours. In spite of the fact that no Raney nickel pretreatment was performed, the catalyst loading for this low pressure process was reduced by ~20%. The results are shown in Table 5.

TABLE 5

| Reaction No. | 5A | 5B | 5C (Comparative) |
|---|---|---|---|
| Purity of IAA | 73.2% | 73.6% | 70–75% |
| THIAA (% total) | 89.8 | 90.6 | 90% |
| Mg from $MgSO_4$ | 1.7 ppm | 2.7 ppm | 0 |
| Total catalyst added(wt. %) | 10.4 | 10.4 | 12.5 |
| Yield of THIAA | 75 | 75 | 70 |
| Time to completion | 5–8.5 h | 5–8.5 h | 4–6 h |

This example demonstrates that THIAA can be produced on a commercial scale using low pressure hydrogenation and under aqueous alkaline conditions. The process of the invention can convert high sulfur hop extract using 20% less catalyst to make THIAA without need for Raney nickel treatment. The process according to the invention also results in an improved yield of 75% vs. the old process which gives a yield of 70%.

EXAMPLE 6

In this example, the simultaneous isomerization and reduction of alpha acids (15 wt. % aqueous solution) to THIAA wherein the catalyst is added incrementally was compared to the simultaneous isomerization and reduction of alpha acids to THIAA wherein the catalyst was added all at once. For reactions 6A–6C, the catalyst was added at hours 0, 1.5, 3, 5 and 7 in ⅕th portions. For comparative reaction 6D, the alpha acid was pretreated 6 hours with 0.05 ratio of 50% wet Ra/Ni at 60° C. The results are shown in Table 6.

TABLE 6

| Reaction No. | 6A | 6B | 6C | 6D |
|---|---|---|---|---|
| % catalyst added in each addition | 20% | 20% | 20% | 100% |

TABLE 6-continued

| Reaction No. | 6A | 6B | 6C | 6D |
|---|---|---|---|---|
| Total Catalyst added (g) | 20.65 | 20.65 | 20.65 | 20.65 |
| Temp. (° C.) | 70–80 | 70–80 | 70–80 | 70–80 |
| Pressure (psig) | 50 | 100 | 150 | 100 |
| Time to completion (hrs) | 14 | 12 | 10 | 9 ¾ |

What is claimed is:

1. A process of converting alpha acid and/or isoalpha acids to tetrahydroisoalpha acid, wherein the tetrahydroisoalpha acid has the following formula:

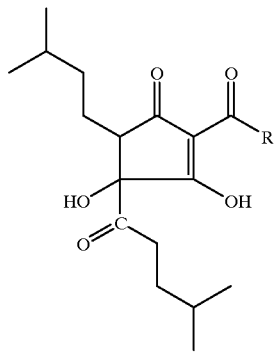

wherein R is a $C_1$–$C_6$ alkyl;
the process comprising the following steps:
(i) isomerizing alpha acid to isoalpha acid;
(ii) hydrogenating the iso alpha acid in the presence of a noble metal catalyst, wherein the noble metal catalyst is added incrementally or continuously throughout the hydrogenation step.

2. The process according to claim 1, wherein R is isopropyl, isobutyl, or sec-butyl.

3. The process according to claim 1, wherein the isomerization step is conducted in the presence of an alkaline earth metal salt or oxide isomerization catalyst.

4. The process according to claim 3, wherein the alkaline earth metal salt is magnesium chloride, calcium chloride or magnesium sulfate.

5. The process according to claim 3, wherein the alkaline earth metal oxide is magnesium oxide.

6. The process according to claim 1, wherein the alpha acid has a sulfur content ranging from about 400 ppm to about 750 ppm.

7. The process according to claim 6, wherein the alpha acid has a sulfur content of at least 550 ppm.

8. The process according to claim 1, wherein the alpha acid is contained in a hop extract.

9. The process according to claim 1, wherein the alpha acid is present in aqueous alkaline solution comprising from about 10 to about 40% by weight alpha acid and having a pH ranging from about 8 to about 12.

10. The process according to claim 1, wherein the noble metal catalyst is added to incrementally throughout the hydrogenation step and wherein the total amount of noble metal catalyst added ranges from about 5% to about 15% by weight based on the isoalpha acid and wherein all of the catalyst is added within about 3 to about 6 hours and the hydrogenation step is complete within about 6 to about 8 hours.

11. The process according to claim 10, wherein from about 2.0% to about 2.5% by weight based on the isoalpha acid of the noble metal catalyst is added every about 2 to about 2.5 hours.

12. The process according to claim 10, wherein all of the catalyst is added within about 4 to about 5 hours.

13. The process according to claim 1, wherein the catalyst is added continuously using a high pressure pump over a period of not less than 30 minutes throughout the hydrogenation step.

14. The process according to claim 13, wherein the catalyst is added at an addition rate of 2% by weight, based on the isoalpha acid, per hour for a period ranging from about 4 to about 6 hours.

15. The process according to claim 1, wherein the hydrogenating step is conducted at a temperature ranging from about 50° C. to about 110° C., a pressure ranging from about 20 psi $H_2$ to about 2000 psi $H_2$, and a pH ranging from about 5.0 to about 12.

16. The process according to claim 15, wherein the pressure is 50 psi.

17. The process according to claim 1, wherein the catalyst is palladium on carbon (Pd/C).

18. The process according to claim 1, wherein a base is added prior to exposure to the noble metal catalyst to maintain a pH of from about 6.5 to about 11.

19. The process according to claim 16, wherein the base is sodium or potassium hydroxide.

20. The process according to claim 1, wherein the isomerizing and hydrogenating steps occur in a protic system solvent.

21. The process according to claim 20, wherein the protic solvent system is water, a $C_1$–$C_3$ alcohol, acetic acid or a mixture thereof.

22. The process according to claim 21, wherein the protic solvent system is aqueous and has a pH ranging from about 5.0 to about 12.

23. The process according to claim 1, wherein the isomerization and hydrogenation steps are conducted substantially simultaneously.

24. The process according to claim 23, wherein the isomerization and hydrogenation steps occur in a protic solvent system.

25. The process according to claim 1, further comprising the step of adding a reducing agent in an amount effective to reduce the tetrahydroisoalpha acid to hexahydroisoalpha acid wherein the hexahydroisoalpha acid has the following formula:

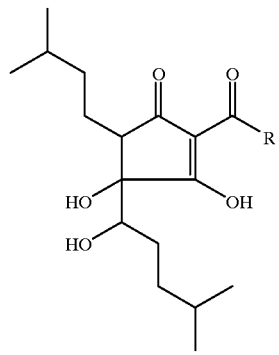

where R is a $C_1$–$C_6$ alkyl.

26. A process according to claim 25, wherein the reducing agent is an alkali metal borohydride.

27. A process according to claim 26, wherein the reducing agent is potassium or sodium borohydride.

28. A process of converting isoalpha acid to tetrahydroisoalpha acid comprising the step of hydrogenating the isoalpha acid in the presence of a noble metal catalyst, wherein the noble metal catalyst is added continuously or incrementally throughout hydrogenating.

* * * * *

UNITED STATES PATENT AND TRADEMARK OFFICE
CERTIFICATE OF CORRECTION

PATENT NO. : 6,198,004 B1
DATED : March 6, 2001
INVENTOR(S) : John Paul Maye et al.

It is certified that error appears in the above-identified patent and that said Letters Patent is hereby corrected as shown below:

<u>Column 15,</u>
Line 2, delete "hydrogenating" and insert -- hydrogenation --.

Signed and Sealed this

Third Day of September, 2002

*Attest:*

JAMES E. ROGAN
*Attesting Officer*  *Director of the United States Patent and Trademark Office*